(12) United States Patent
Park

(10) Patent No.: US 6,185,358 B1
(45) Date of Patent: Feb. 6, 2001

(54) OPTICAL ATTENUATOR AND METHOD OF MANUFACTURING SAME

(75) Inventor: Chan-Sik Park, Gumi (KR)

(73) Assignee: SamSung Electronics Co., Ltd., Suwon (KR)

( * ) Notice: Under 35 U.S.C. 154(b), the term of this patent shall be extended for 0 days.

(21) Appl. No.: 08/984,150

(22) Filed: Dec. 3, 1997

(30) Foreign Application Priority Data

Dec. 3, 1996 (KR) .................................................. 96-61400

(51) Int. Cl.[7] .................................................. G02B 6/00
(52) U.S. Cl. .................................................. 385/140; 385/37
(58) Field of Search .................................. 385/140, 14, 12, 385/37, 31, 147

(56) References Cited

U.S. PATENT DOCUMENTS

| | | | |
|---|---|---|---|
| 4,557,557 | 12/1985 | Gleason et al. | 385/140 X |
| 4,593,969 | * 6/1986 | Goodman et al. | 385/37 X |
| 4,749,248 | 6/1988 | Aberson, Jr. et al. | 385/37 X |
| 4,884,859 | 12/1989 | Yamamoto et al. | 385/37 X |
| 4,893,889 | * 1/1990 | Iwakiri et al. | 385/140 X |
| 5,022,734 | 6/1991 | Kashyap | 385/31 X |
| 5,048,913 | 9/1991 | Glenn et al. | 385/37 |
| 5,066,094 | * 11/1991 | Takahashi | 385/140 X |
| 5,066,133 | 11/1991 | Brienza | 359/570 |
| 5,323,404 | 6/1994 | Grubb | 372/6 |
| 5,351,321 | 9/1994 | Snitzer et al. | 385/37 X |
| 5,351,324 | 9/1994 | Forman | 385/37 |
| 5,367,588 | 11/1994 | Hill et al. | 385/37 |

(List continued on next page.)

FOREIGN PATENT DOCUMENTS

| | | | |
|---|---|---|---|
| 26 32 861 | 1/1978 | (DE) . | |
| 2 252 841 | 8/1992 | (GB) | 385/140 X |
| 2 289 770 | 11/1995 | (GB) | 385/12 X |
| 2 291 208 | 1/1996 | (GB) | 385/12 X |
| 2 295 689 | 6/1996 | (GB) | 385/12 X |
| 8-286061 | 11/1996 | (JP) | 385/140 X |

OTHER PUBLICATIONS

International Application Published under the Patent Cooperation Treaty No. WO96/24871 on Aug. 1996 with title "Arrangement and Method at an Optical Fibre".

Patent Abstract of Japan 08286061 to Iwashima, entitled "Optical Filter" dated Nov. 1, 1996, one page.

K.Hogari, Y.Miyajima, S.Furukawa, N.Tomita, K.Tomiyama and M. Ohashi, Electronics Letters, Jun. 20, 1996 vol.32 No. 13, entitled "Wideband and Highly Reflective Step–Chirped Fibre Grating Filter Embedded in an Optical Fibre Connector".

Patent Abstract of Japan 58010701 to Yasuda, entitled "Optical Variable Attenuator" dated Jan. 21, 1983, one page.

John A. Rogers, Rebecca J. Jackman, and GeorgeM. Whitesides; Jefferson L. Wagener and Ashish M. Vengsarkar, Appl. Phys. Lett. 70(1). Jan. 6, 1997, entitled "Using Microcontact Printing to Generate Amplitude Photomasks on th e Surfaces of Optical Fibers; A Method for Producing In–Fiber Gratings".

Ashish M. Vengsarkar, Paul J. Lemaire, Justin B. Judkins, Vikram Bhatia, Journal of Lightwave Technology, vol. 14, No. 1 Jan. 1996, entitled "Long–Period Fiber Gratings as Band–Rejection Filters".

*Primary Examiner*—Brian Healy
(74) *Attorney, Agent, or Firm*—Robert E. Bushnell, Esq.

(57) ABSTRACT

An optical attenuator and process for manufacturing optical attenuators. The optical attenuator includes an optical fiber installed in a tube so as not to be influenced by a change in external circumstances, and at least one grating formed in the optical fiber, for breaking total reflection conditions by varying refractive indices of a core layer and a clad layer of the optical fiber in order to attenuate incident light during optical transmission.

14 Claims, 3 Drawing Sheets

U.S. PATENT DOCUMENTS

| | | | |
|---|---|---|---|
| 5,367,589 | 11/1994 | MacDonald et al. | 385/37 |
| 5,384,885 * | 1/1995 | Diner | 385/140 |
| 5,398,296 | 3/1995 | Lin et al. | 385/96 |
| 5,430,817 | 7/1995 | Vengsarkar | 385/37 |
| 5,448,659 | 9/1995 | Tsutsui et al. | 385/14 |
| 5,574,810 | 11/1996 | Byron et al. | 385/37 |
| 5,604,829 | 2/1997 | Bruesselbach | 385/37 |
| 5,684,297 | 11/1997 | Tardy | 250/227.14 |
| 5,699,468 * | 12/1997 | Farries et al. | 385/140 |
| 5,706,379 * | 1/1998 | Serafini et al. | 385/75 |
| 5,805,759 * | 9/1998 | Fukushima | 385/140 |

* cited by examiner

OPTICAL ATTENUATOR AND METHOD OF MANUFACTURING SAME

CLAIM OF PRIORITY

This application makes reference to, incorporates the same herein, and claims all benefits accruing under 35 U.S.C § 119 from an application entitled OPTICAL ATTENUATOR AND METHOD OF MANUFACTURING SAME earlier filed in the Korean Industrial Property Office on the $3^{rd}$ day of December 1996, and there duly assigned Serial No. 96-61400 by that Office.

BACKGROUND OF THE INVENTION

1. Field of the Invention

The present invention relates generally to an optical attenuators and processes for manufacturing optical attenuators, and, more particularly, to an optical attenuator and a process of manufacturing optical attenuators able to attenuate incident light of an optical fiber by varying a refractive index of a core layer of the optical fiber.

2. Description of the Related Art

Generally, when processing an optical communication signal carried by an optical transmission network, an optical signal exhibiting some degree of strength within a light receiving range of an optical receiver module should be received. If the strength of the optical signal exceeds the range of capacity for the light receiver, an error is likely to occur in the optical receiver module that will cause a serious problem in an operating lifetime. To solve theses disadvantages, an optical attenuator has been used.

Optical attenuators may be classified as either a plug-in type or an in-line type, as are discussed in greater detail in conjunction with attenuators illustrated by FIGS. 1 and 2 of this application. Examples of earlier efforts in the art are exemplified by way of illustration, by the Ruggedized Grated Optical Fiber of Jack E. Goodman, et alii, U.S. Pat. No. 4,593,969; the Optical Waveguide Embedded Transverse Spatial Mode Discrimination Filter of William H. Glenn, et alii, U.S. Pat. No. 5,048,913; the Optical Fiber Laser Or Amplifier Including High Reflectivity Gratings of Stephen G. Grubb, U.S. Pat. No. 5,323,404; and the Optical Fiber Package of William M. MacDonald, et alii, U.S. Pat. No. 5,367,589; and the techniques for creating gratings mentioned in Bragg Grating Made In Optical Waveguide of Elias Snitzer, et alii, U.S. Pat. No. 5,351,321, in Method Of Fabricating Bragg Gratings Using A Silica Glass Phase Grating Mask And Mask Used By Same of Kenneth O. Hill, et alii, U.S. Pat. No. 5,367,588, the Incubated Bragg Gratings In Waveguides of Kevin C. Byron, et alii, U.S. Pat. No. 5,574,810, the Optical Waveguide With Diffraction Grating And Method Of Forming The Same, of Hans Bruesselbach, U.S. Pat. No. 5,604,829, and the Method Of Detecting And/Or Measuring Physical Magnitudes using a Distribution Sensor of And/oe Tardy, U.S. Pat. No. 5,684,297.

Both plug-in and an in-line types of attenuators often seek to attenuate the strength of incident light traveling between two adjoining lengths of optical fiber by inserting a thin film optical filter into a ferrule or a sleeve. In order to attenuate the incident light by reflecting or absorbing the optical signal, the thin film optical filter is coated to a multilayer structure by using various kinds of metal elements and finally processes its both surfaces by non-reflection coating so as to maintain a non-reflectance of 99.8% or more.

With conventional designs of plug-in type of optical attenuators, however, because it has been difficult to process the thin film filter to obtain a non-reflective coating that provides non-reflectance of 99.8% or more, any optical signal that is reflected in a very high speed optical transmission network of 2.5 Giga-bits per second or more backwardly enters the interior of the optical fiber. Consequently, an error in the optical signal is likely to occur. Moreover, since the thin film filter bearing the thin film coating and the non-reflective coating may easily become separated due to temperature and humidity, the characteristics of the optical signal may vary according to the wavelength of the optical signals. Furthermore, since the optical fiber is cut at an angle of eight degrees and the thin film filter is fixed between the ferrules in order to attenuate the incident light of the optical fiber, even though no contact is made by external components and the thin film filter during coupling of the optical connector, additional components must be used in order to connect the optical adaptor to the optical distribution box. These additional optical components increase the cost of a product and make it exceedingly difficult to pack the optical connectors in a dense array in the optical distribution box.

Additionally, with conventional optical in-line attenuators, since it is difficult to obtain a thin film filter with the non-reflection coating providing a non-reflectance of 99.8% or more, the optical signal reflected in the very high speed optical transmission network of 2.5 Gbps or more is reflected backwardly into the interior of the optical fiber and causes errors in the optical signal. Moreover, due to separation of the thin film filter bearing the thin film and non-reflection coating due to temperature and humidity, the characteristics of the optical signal tend to vary according to wavelength. Furthermore, since the middle portion of the optical cable is cut and the thin film filter inserted between the adjoining end surfaces in order to attenuate the incident light of the optical fiber, the tensile strength of the optical cable is reduced and it is difficult to process and manage the presence of any additional optical cable within the optical distribution box.

SUMMARY OF THE INVENTION

It is an object of the present invention to provide an improved optical attenuator and process for manufacturing optical attenuators.

It is another object to provide an optical attenuator and process for manufacturing optical attenuators that are able to attenuate the incident light of an optical fiber without using an additional thin film filter.

It is still another object to provide an optical attenuator and process for manufacturing optical attenuators that can attenuate the incident light of an optical fiber by varying a refractive index of a core layer of the optical fiber.

It is yet another object to provide an optical attenuator and process for manufacturing optical attenuators that can easily process and manage an extra optical cable within an optical distribution box.

It is still yet another object to provide an optical attenuator and process for manufacturing optical attenuators that does not vary in characteristic even if after a long period of non-use.

It is a further object to provide an optical attenuator and process for manufacturing optical attenuators that can minimize the size of optical attenuators.

It is also an object to provide processes for fabricating optical attenuators in situ within an unbroken length of an optical fiber, and to provide unbroken optical fibers containing optical attenuators formed in situ.

According to one aspect of the present invention, an optical attenuator includes an optical fiber installed in a tube able to shield the optical filter from influences of changes in external circumstances, and at least one grating formed in the optical fiber, for breaking total reflection conditions due to varying refractive indices of a core layer and a clad layer of the optical fiber in order to attenuate incident light during optical transmission.

According to another aspect of the present invention, a process for manufacturing an optical attenuator includes the steps of emitting an optical source of an excimer laser to an optical fiber by a phase mask process in order to break total reflection conditions by varying refractive indices of a core layer and a clad layer of the optical fiber, and forming a plurality of first gratings at intervals within the range of 500 nm~600 nm in order to attenuate the incident light of the optical fiber and to reflect or pass the light of other wavelengths.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

In the context of this description, the adjective "optical" is intended to refer to that part of the electromagnetic spectrum that is generally known as the visible region together with those parts of the infrared and ultraviolet regions at each end of the visible region that are capable of being transmitted by dielectric optical waveguides such as optical fibers.

Figure 1:
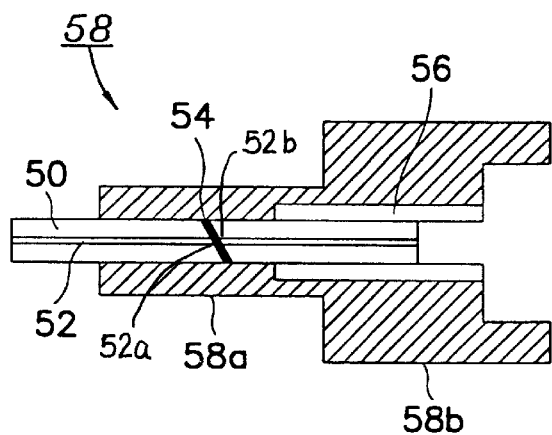
FIG. 1 shows a conventional plug-in type of optical attenuator.

Turning now to the drawings, FIG. 1 illustrates an optical attenuator 58 of the plug-in type. Optical attenuator 58 has opposite ends terminating with a connector 58a that may be connected to an optical transmission box of an optical transmission network and an adaptor 58b that may be connected to an optical distribution box. Ferrule 50 surrounds and holds an optical fiber 52 installed in the interior of optical attenuator 58. Optical fiber 52 conducts optical signals between the optical transmission network and the optical distribution box. A sleeve 56 surrounds and holds ferrule 50 within the interior cavity of adapter 58b, while ferrule 50 supports optical fiber 52. A thin film optical filter 54 is installed between facing obliquely cut end surfaces 52a, 52b of optical fiber 52 and ferrule 50 at an angle of 8 degrees, in order to attenuate the strength of the incident light conducted by optical fiber 52. In order to attenuate the incident light by reflecting or absorbing the optical signal, thin film filter 54 is coated to form a multilayer structure, with various kinds of metal elements. Both surfaces of thin film filter 54 have a non-reflection coating so as to maintain a non-reflectance of 99.8% or more.

Figure 2:
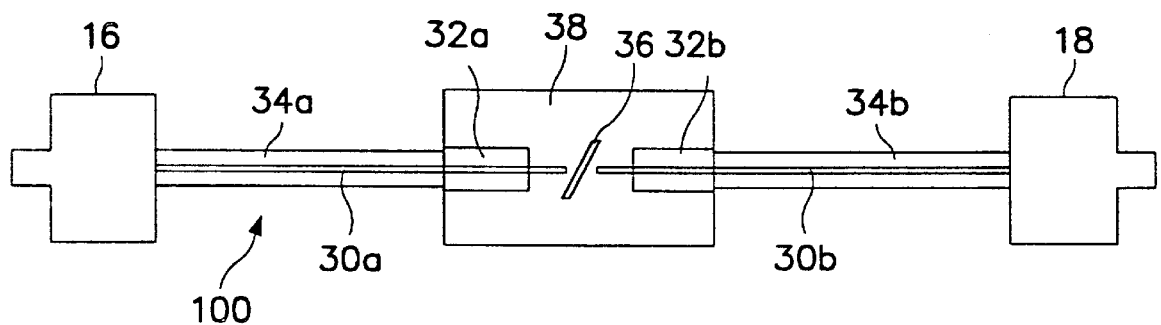
FIG. 2 shows a conventional in-line type of optical attenuator.

FIG. 2 shows a design for an in-line type of optical attenuator. A first connector 16 that may be connected to the optical transmission box for an optical transmission network and a second connector 18 that may be connected to the optical distribution box, are installed at opposite ends of optical attenuator 38. First and second connectors 16, 18 are connected to opposite ends of optical cable 100. The outermost layer of the optical cable 100 is covered with tubes 34a, 34b that protect optical fibers 30a, 30b respectively from changes in external circumstances. After optical cable 100 is cut at an intermediate location, ferrule 32a that is connected to first connector 16, is installed in proximity to the cut in order to retain and support the end of optical fiber 30a that is exposed when the distal end of optical cable tube 34a adjoining the cut is peeled off the exterior surface of optical fiber 30a. Similarly, a ferrule 32b that is connected to second connector 18, is installed to retain and support the end of optical fiber 30b that is exposed when a part of optical cable tube 34b adjoining the cut is peeled off of optical fiber 30b. When optical fibers 30a and 30b have been cut, a thin film optical filter 36 is installed between optical fibers 30a and 30b at an angle of eight degrees in order to attenuate the strength of the incident light from the optical fiber 30a. Thin film filter 36 is manufactured by the same earlier described process. Case 38 is packed to protect thin film filter 36 and ferrules 32a and 32b holding optical fibers 30a and 30b.

Figure 3:
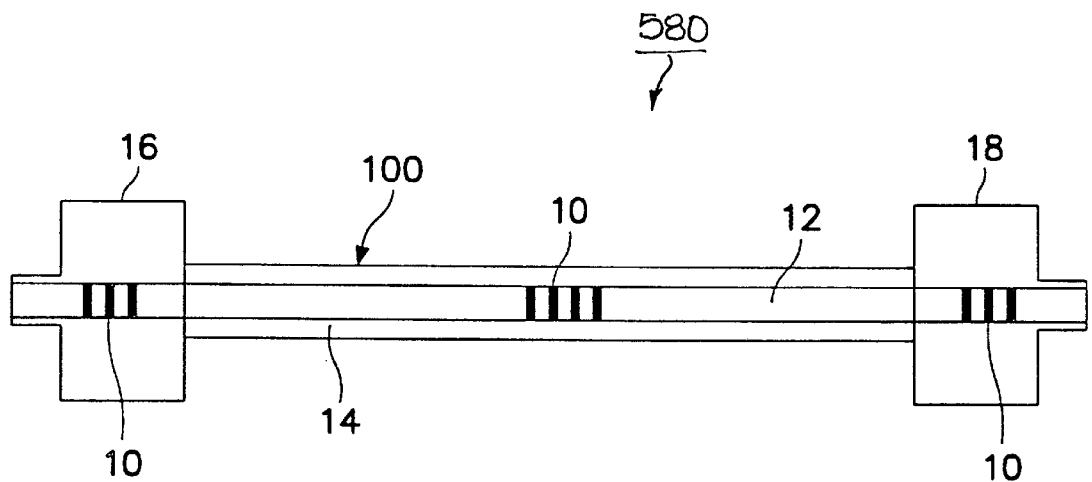
FIG. 3 shows an optical attenuator manufactured by an optical source of an eximer laser according to the principles of the present invention.
Figure 4:
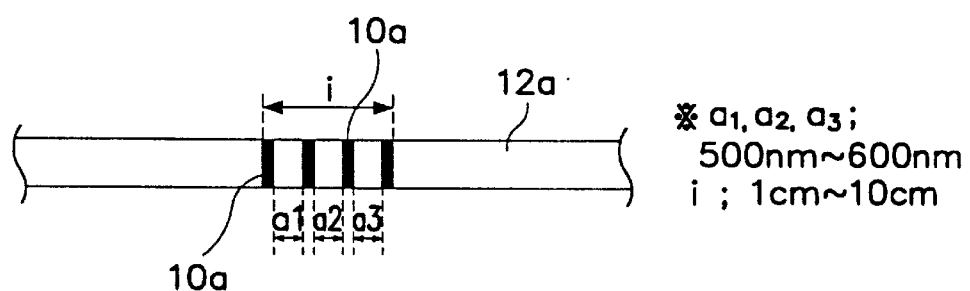
FIG. 4 shows a process for manufacturing an optical attenuator by emitting an optical source of an eximer laser to an optical fiber at regular intervals by a phase mask process according to the practice of a first embodiment of the present invention.
Figure 5:
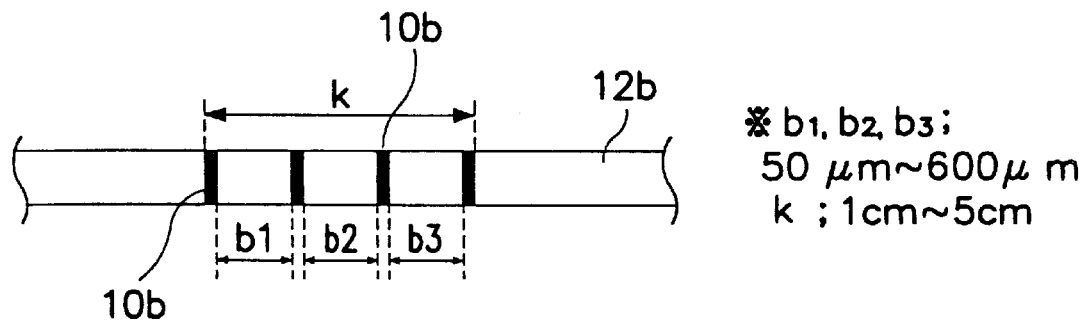
FIG. 5 shows another process for manufacturing an optical attenuator by emitting an optical source of an eximer laser to an optical fiber at regular intervals by an amplitude mask process according to the practice of a second embodiment of the present invention.
Figure 6:
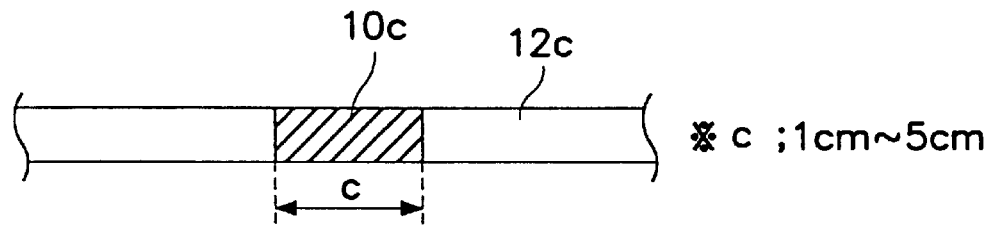
FIG. 6 shows a further process for manufacturing an optical attenuator by successively emitting an optical source of an eximer laser to an optical fiber by an amplitude mask process according to the practice of a third embodiment of the present invention.

Turning now to FIGS. 3, 4, 5 and 6 collectively, an optical attenuator 580 manufactured by an optical source of an eximer laser has a grating 10 that may be a first grating 10a, a second grating 0b shown in FIG. 5, or a third grating 10c shown in FIG. 6. A first connector 16 connected to an optical transmission box of an optical transmission network and a second connector 18 connected to an optical distribution box, are installed at opposite ends of optical attenuator 580. First and second connectors 16, 18 respectively, are connected to optical cable 100. The outermost layer of optical cable 100 is covered with a tube 14 that protects optical fiber 12 from changes in external circumstances, such as variations in ambient environmental conditions such as in humidity and temperature.

Optical fiber 12 has a core layer surrounded and encased by a clad layer. A plurality of gratings 10 (n.b., three gratings 10 are shown in FIG. 3) are formed transversley across the width of optical fiber 12 by an optical source, namely an excimer laser, at regular, spaced-apart intervals within different sections of optical fiber 12. During transmission of optical signals along optical fiber 100, gratings 10 attenuate the incident light of the optical fiber 12, by a desired quantity by varying the refractive indices of the core layer and the clad layer of optical fiber 12, and thus avoid total reflection conditions. That is, if the optical source is a strong excimer laser is projected onto optical fiber 12, an ion deposited on the core layer of the optical fiber 12 is re-combined by light energy to vary the refractive index of the core layer of optical fiber 12. Then, gratings 10 are formed because total reflection conditions are not caused by differences in the refractive indices between the core layer and the clad layer. The quantity of light attenuation can be selectively adjusted in accordance with the time of emission by the eximer laser and the area of optical fiber 12 illuminated by the optical source.

Different methods for manufacturing optical attenuator 580 as shown in FIG. 3 are described with reference to the illustrations provided by FIGS. 4, 5 and 6. FIG. 4 shows a method of manufacturing the optical attenuator by emitting optical energy from an excimer laser to illuminate regular intervals of optical fiber 12a at regular intervals by using a phase mask process. To break the total reflection conditions by varying the refractive indices of the core layer and clad layer of optical fiber 12a, the optical source of the excimer laser is emitted onto optical fiber 12a by the phase mask process. The excimer laser emits the optical source to optical fiber 12a at an energy within the range of approximately 50 megawatts to approximately 400 megawatts with a voltage within the range of approximately 15 kilovolts to approximately 19 kilovolts and a pulse frequency per unit time within the range of approximately 5 Hertz to approximately 15 Hertz. Then the plurality of first gratings 10a are formed to serve as an optical attenuator for attenuating the incident light of the optical fiber 12a by a desired quantity during optical transmission of the light in the form of optical signals and to serve as an optical filter for either reflecting or passing the light of other wavelengths are formed at regular intervals a1, a2 and a3 along a section of optical fiber 12a. The intervals a1, a2 and a3 are respectively set within the range of approximately 500 nanometers to approximately 600 nanometers. One grating, or two or more gratings, may be formed over a section i having a linear dimension along the length of optical fiber 12a with a range extending between approximately one centimeter and approximately ten centimeters, depending upon the desired quantity of light attenuation. An attenuator manufactured by the above phase mask process can be used at wavelengths of around approximately 1550 nanometers.

FIG. 5 shows a method for manufacturing an optical attenuator by emitting the optical source of the eximer laser onto the optical fiber at regular intervals by using an amplitude mask process. To break the total reflection conditions by varying the refractive indices of the core layer and clad layer of optical fiber 12b, the optical power emitted by the excimer laser is projected onto optical fiber 12b by using the amplitude mask process. The excimer laser emits the optical energy onto optical fiber 12b by forming energy within a range of approximately 50 megawatts to approximately 400 megawatts with a voltage within the range of approximately 15 kiloVolts to approximately 19 kilovolts at a pulse frequency per unit time of approximately 5 Hertz to approximately 15 Hertz. Then, a plurality of second gratings 10b are formed at regular intervals b1, b2 and b3 for attenuating the incident light of optical fiber 12b by a desired quantity during optical transmission along the length of optical fiber 12b. Intervals b1, b2 and b3 are respectively set within the range of approximately 50 micrometers to approximately 60 micrometers. Either one grating, or two or more gratings, may be formed over a section k having a linear dimension along the length of optical fiber 12b with a range extending between approximately one centimeter and approximately five centimeters according to the desired quantity of light attenuation. An optical attenuator manufactured by the above amplitude mask process can be used at wavelengths around approximately 1550 nanometers.

FIG. 6 shows a method of manufacturing the optical attenuator by successively emitting the optical energy from an excimer laser onto optical fiber 12c by the amplitude mask process. To break the total reflection conditions by varying the refractive indices of the core layer and clad layer of optical fiber 12c, the optical energy emitted by an eximer laser is projected onto optical fiber 12c by using the amplitude mask process. The eximer laser emits the optical energy onto optical fiber 12c at an energy amplitude within a range of between approximately 50 megawatts to 400 megawatts with a voltage of between approximately 15 kiloVolts and 19 kiloVolts and a pulse frequency per unit time within a range of between approximately 5 Hertz and 15 Hertz. Then, third grating 10c is formed as a single, unitary section without any intervening interruption along section c, for attenuating the incident light traveling along the length of optical fiber 12c by a desired quantity during optical transmission. Section c is formed as a unitary, uninterrupted length having a linear dimension along the length of optical fiber 12c with a range of between approximately one centimeter and approximately five centimeters. An attenuator manufactured by this amplitude mask process can be used at wavelengths around approximately 1550 nanometers.

As described above, since the optical attenuator function is directly fabricated in situ within the optical fiber while installed in the optical cable, the resulting structure is not adversely influenced by changes in external conditions such as ambient temperature or humidity. Moreover, since the optical attenuator is manufactured by emitting energy from a source of light such as an excimer laser onto the optical fiber, it is easy and relatively quick to manufacture an optical attenuator with accurate and reliable properties, without the undue increase in cross-sectional area necessitated by the conventional plug-in and in-line type optical attenuators. Consequently, extra optical cable may be easily accommodated within the optical distribution box without the presence of any additional thin film filter. Therefore, the cost of the product can be reduced. When packing the optical attenuator in the optical distribution box, additional optical components are not required, and thus the number of optical components can be substantially reduced. Further, the weight of the product can be minimized.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An optical attenuator, comprising:
   an optical cable, comprising:
      an optical fiber having a core and a cladding surrounding said core, the refractive indices of said core and said cladding allowing total reflection of light in the core;
      a first grating in said optical fiber in which the refractive indices of said core and said cladding are sufficiently similar such that total reflection of light in the core does not occur, said first grating having a length in the range of approximately 1 cm to 5 cm; and
      a tube jacketing said optical fiber, for protecting the optical fiber from ambient conditions;
   a first connector installed at one end of the optical cable, for connecting to an optical transmission box; and
   a second connector installed at the other end of the optical cable, for connecting to an optical distribution box.

2. The optical attenuator of claim 1, said first grating being in the portion of the optical fiber between the first connector and second connector.

3. The optical attenuator of claim 1, said first grating being in the portion of the optical fiber within said first connector.

4. The optical attenuator of claim 1, said first grating being in the portion of the optical fiber within said second connector.

5. The optical attenuator of claim 1, further comprising:
   a second grating in the optical fiber in which the refractive indices of said core and said cladding are sufficiently similar such that total reflection of light in the core does not occur, said second grating having a length in the range of approximately 1 cm to 5 cm, said second grating being separate from said first grating.

6. The optical attenuator of claim 5, further comprising:
   a third grating in the optical fiber in which the refractive indices of said core and said cladding are sufficiently similar such that total reflection of light in the core does not occur, said third grating having a length in the range of approximately 1 cm to 5 cm, said third grating being separate from said first grating and second grating.

7. The optical attenuator of claim 6, said first, second and third gratings being located, respectively, within the first connector, in the portion of the optical fiber between the first connector and second connector, and within the second connector.

8. The optical attenuator of claim 1, said first grating being formed by excimer laser irradiation of the optical fiber.

9. The optical attenuator of claim 1, said first grating being formed by excimer laser irradiation of the optical cable through the tube.

10. The optical attenuator of claim 9, the excimer laser being operated at a voltage of between approximately 15 and 19 kV.

11. The optical attenuator of claim 10, the excimer laser being operated at a pulse frequency of between approximately 5 and 15 Hz.

12. The optical attenuator of claim 9, said excimer laser irradiation being performed using an amplitude mask.

13. The optical attenuator of claim 7, said first, second and third gratings being formed by excimer laser irradiation of the optical fiber.

14. An optical attenuator, comprising:
an optical cable, comprising:
   an optical fiber having a core and a cladding surrounding said core, with refractive indices of said core and said cladding allowing substantially total reflection of light in said core;
   a first grating having a length in a range of between approximately one centimeter and approximately five centimeters, disposed within said optical fiber with refractive indices of said core and said cladding being sufficiently similar to prevent occurrence of total reflection of light within said core;
   a second grating having a length in a range of between approximately one centimeter and approximately five centimeters, disposed within said optical fiber with refractive indices of said core and said cladding being sufficiently similar to prevent occurrence of total reflection of light in said core, said second grating being separate and distinct from said first grating;
   a third grating having a length in a range of between approximately one centimeter and approximately five centimeters, disposed within said optical fiber with refractive indices of said core and said cladding being sufficiently similar to prevent occurrence of total reflection of light in said core, said third grating being separate and distinct from said first grating and from second grating;
   a tube jacketing said optical fiber, and protecting said optical fiber from ambient conditions;
   a first connector disposed at a first end of said cable to optically couple said cable to an optical transmission box;
   a second connector disposed at a second and opposite end of said cable to optically couple said cable to an optical distribution box; and
   said first, second and third gratings being located, respectively, within said first connector, in a portion of said optical fiber between said first connector and said second connector, and within said second connector.

* * * * *